United States Patent
Edwards et al.

(10) Patent No.: US 9,483,060 B2
(45) Date of Patent: Nov. 1, 2016

(54) PRESSURE REGULATOR

(71) Applicants: Richard Edwards, Lichfield (GB); Jagroop Singh Sahota, Coventry (GB)

(72) Inventors: Richard Edwards, Lichfield (GB); Jagroop Singh Sahota, Coventry (GB)

(73) Assignee: Norgren Limited, Staffordshire (GB)

( * ) Notice: Subject to any disclaimer, the term of this patent is extended or adjusted under 35 U.S.C. 154(b) by 0 days.

(21) Appl. No.: 14/736,576

(22) Filed: Jun. 11, 2015

(65) Prior Publication Data
US 2015/0277449 A1  Oct. 1, 2015

Related U.S. Application Data (62) Division of application No. 13/512,632, filed as application No. PCT/GB2010/002286 on Dec. 16, 2010, now Pat. No. 9,195,241.

(51) Int. Cl.
*G05D 16/06* (2006.01)
*F16K 31/126* (2006.01)

(52) U.S. Cl.
CPC ......... *G05D 16/0655* (2013.01); *F16K 31/126* (2013.01); *G05D 16/0633* (2013.01); *G05D 16/0661* (2013.01); *Y10T 137/7793* (2015.04); *Y10T 137/7794* (2015.04); *Y10T 137/7796* (2015.04); *Y10T 137/7797* (2015.04); *Y10T 137/7825* (2015.04)

(58) Field of Classification Search
CPC ............... G05D 16/0633; G05D 16/0638; G05D 16/0658; G05D 16/0661; G05D 16/0655; Y10T 137/7793; Y10T 137/7794; Y10T 137/7822; Y10T 137/7823; Y10T 137/7825; Y10T 137/7796; Y10T 137/7797; F16K 31/126

USPC ............ 137/505.11, 505.14, 505.38, 505.39, 137/505.41
See application file for complete search history.

(56) References Cited

U.S. PATENT DOCUMENTS

| | | | | |
|---|---|---|---|---|
| 2,093,671 A | * | 9/1937 | Giffen ................ | G05D 16/0655 137/505 |
| 2,482,291 A | * | 9/1949 | Bent ......................... | B03B 5/30 137/506 |
| 2,663,122 A | * | 12/1953 | Cornelius .......... | G05D 16/0655 137/505.18 |
| 2,707,966 A | * | 5/1955 | Taplin ................ | G05D 16/0663 137/116.5 |

(Continued)

FOREIGN PATENT DOCUMENTS

| CN | 1178116 C | 12/2004 |
|---|---|---|
| EP | 0332389 A1 | 9/1989 |

(Continued)

*Primary Examiner* — William McCalister
(74) *Attorney, Agent, or Firm* — The Ollila Law Group LLC (57) ABSTRACT

A pressure regulator (100) is provided. The pressure regulator (100) includes various features that reduce the risk of internal leaking The pressure regulator (100) includes a regulator body (101) including a fluid inlet (107) with a valve seat (106) and a fluid outlet (108) and a cap (102) coupled to the regulator body (101). The pressure regulator (100) also includes a diaphragm (103) with a first side (103a) exposed to the fluid inlet (107) and the fluid outlet (108) and a second side (103b) exposed to the cap (102). The diaphragm (103) can frictionally engage the regulator body (101) to form a fluid tight seal. Additionally, the diaphragm (103) may include a socket (118) formed in the diaphragm (103) and a valve member (105) including a valve stem (110) with a ball (118) that is adapted to engage the socket (118) formed in the diaphragm (103) in order to couple the valve member (105) to the diaphragm (103).

11 Claims, 5 Drawing Sheets

(56) References Cited

U.S. PATENT DOCUMENTS

| | | | | |
|---|---|---|---|---|
| 2,819,728 | A * | 1/1958 | Gage | G05D 7/0106 137/505.11 |
| 3,223,116 | A * | 12/1965 | Criddle | F16K 7/00 137/505.13 |
| 3,457,837 | A * | 7/1969 | Powell | B66D 1/08 137/116.3 |
| 3,463,183 | A * | 8/1969 | Wallace | G05D 16/0636 137/505.41 |
| 3,572,219 | A * | 3/1971 | Katchka | G05D 16/0672 137/505.41 |
| 3,994,358 | A * | 11/1976 | Smitley | B60K 15/01 137/39 |
| 4,624,632 | A * | 11/1986 | Barnes | F23N 5/067 137/828 |
| 4,825,835 | A * | 5/1989 | Deweerdt | F02M 69/54 123/456 |
| 4,940,170 | A | 7/1990 | Popp-Ginsbach | |
| 5,076,322 | A * | 12/1991 | Choksi | A61M 1/0031 137/505.13 |
| 5,988,204 | A * | 11/1999 | Reinhardt | G05D 16/0661 137/271 |
| 6,289,925 | B1 | 9/2001 | Miyazoe | |
| 7,114,520 | B2 * | 10/2006 | Massengale | G05D 16/0647 137/505.41 |
| 2002/0074043 | A1 | 6/2002 | Beyer et al. | |
| 2006/0267403 | A1* | 11/2006 | Newton | F16K 1/307 303/84.2 |
| 2007/0151606 | A1* | 7/2007 | Querejeta | G05D 16/0655 137/505.36 |

FOREIGN PATENT DOCUMENTS

| | | |
|---|---|---|
| EP | 1715400 A1 | 10/2006 |
| WO | 9953388 A1 | 10/1999 |

* cited by examiner

PRESSURE REGULATOR

RELATED APPLICATION

This application is a divisional application of U.S. application Ser. No. 13/512,632, filed May 30, 2012, which is a National Stage Application of International Application No. PCT/GB10/02286, filed Dec. 16, 2010.

TECHNICAL FIELD

The present invention relates to, pressure regulators, and more particularly, to a pressure regulator with increased sealing capabilities.

BACKGROUND OF THE INVENTION

Pressure regulators are generally known in the art for reducing a high input pressure to a lower (regulated) output operating pressure. Many pressure regulators operate by limiting the size of the fluid flow path through which the input pressure is allowed to flow in order to decrease the pressure to a suitable output pressure. Generally, the pressure regulator is provided with a flexible diaphragm that is biased using a spring to press a valve member against a valve seat. The force of the spring is often adjusted so the valve opens at a predetermined pressure, resulting in a set outlet pressure. However, if there are large fluctuations in the inlet pressure, the spring must be continuously adjusted to maintain the desired outlet pressure.

One problem generally encountered in pressure regulators is internal leakage of the valve also known as "regulator creep." Regulator creep often occurs due to a faulty valve to valve-seat seal resulting in a small, undesired amount of fluid leaking through the valve. While this small leakage may not cause concern in certain applications, some situations have a limited amount of fluid that can be supplied to the inlet and thus even small losses can have serious consequences. Such an example is in a portable infusion device that has a pressurized bladder. If the pressure in the bladder leaks over time, the infusion device may need to be replaced prematurely. Internal leakage can also occur if the connection between the valve stem and the diaphragm loosens. Typically, the valve stem is held relatively loosely to the diaphragm, if at all. Generally, this is not seen as a problem because the valve stem is typically compressed against the diaphragm by the fluid rather than pulled away from it. However, in some situations, this may not be the case and the pressurized fluid acting on the diaphragm may attempt to pull the valve stem away from the diaphragm. Currently there is no acceptable system for efficiently retaining the valve stem to the diaphragm.

Another problem with many pressure regulators that utilize a diaphragm is the excessive number of parts. Typically, the diaphragm is clamped into position in the regulator body using some sort of a retaining ring or an additional seal. The majority of diaphragms are produced as a sub-assembly consisting of up to three components, the diaphragm being sandwiched between a diaphragm rivet and spring rest. This itself can also be a potential leak path. Alternatively, the diaphragm may be held in place by clamping the diaphragm between the regulator body and a cap. One problem with this design is that if the cap becomes loosened due to vibrations, for example, the diaphragm could become unsealed resulting in a leaking regulator. Another problem with this design is that it requires an additional component to adjust the compression of the spring. Neither situation is ideal.

One particular application that has recently started to implement pressure regulators is in portable infusion devices. The infusion device includes a pressure source, typically around 2.5 bar (36.3 psi); however, the pressure may vary from one application to another. The pressure regulator is used to decrease the pressure to around 0.5 bar (7.3 psi), which is then delivered to a bladder at a constant pressure. The constant pressure delivered by the pressure regulator acts via the bladder to compress the infusion bag to deliver a constant flow of fluid to a patient. As can be appreciated, any variation in the pressure delivered from the pressure regulator could have serious consequences. Therefore, even small leaks in the system can be disastrous. In addition, because the infusion devices are typically designed to be disposable, the pressure regulator used with the system should be relatively inexpensive to manufacture.

The present invention provides a pressure regulator with an increased sealing potential, which reduces the risk of the regulator leaking Furthermore, the pressure regulator of the present invention has reduced the number of necessary parts, thereby decreasing the cost of manufacturing. Therefore, the pressure regulator of the present invention may comprise a disposable unit.

SUMMARY OF THE INVENTION

A pressure regulator is provided according to an embodiment of the invention. The pressure regulator comprises a regulator body including a fluid inlet and a fluid outlet. The pressure regulator also includes a cap coupled to the regulator body. According to an embodiment of the invention, the pressure regulator includes a diaphragm positioned within the regulator body. The diaphragm can include a first side exposed to the fluid inlet and the fluid outlet and a second side exposed to the cap. According to an embodiment of the invention, the diaphragm also includes a retaining rim configured to frictionally engage the regulator body to form a substantially fluid tight seal between the diaphragm and the regulator body. According to an embodiment of the invention, the pressure regulator includes a valve member including a valve stem extending through the fluid inlet and coupled to the diaphragm.

A pressure regulator is provided according to another embodiment of the invention. The pressure regulator can include a regulator body including a fluid inlet with a valve seat and a fluid outlet. The pressure regulator can also include a cap coupled to the regulator body and a diaphragm coupled to the regulator body and comprising a first side exposed to the fluid inlet and the fluid outlet and a second side exposed to the cap. According to an embodiment of the invention, a socket is formed in the diaphragm. A valve member including a valve stem with a ball can be provided that is adapted to engage the socket formed in the diaphragm in order to couple the valve member to the diaphragm.

Aspects

According to an aspect of the invention, a pressure regulator comprises:
  a regulator body including a fluid inlet and a fluid outlet;
  a cap coupled to the regulator body;
  a diaphragm positioned within the regulator body and including:
    a first side exposed to the fluid inlet and the fluid outlet;
    a second side exposed to the cap; and a retaining rim configured to frictionally engage the regulator body to form a substantially fluid tight seal between the diaphragm and the regulator body; and a valve member including a valve stem extending through the fluid inlet and coupled to the diaphragm.

Preferably, the pressure regulator further comprises a receiving groove formed in the regulator body and a retaining protrusion extending from the regulator body, wherein the retaining rim frictionally engages the receiving groove and the retaining protrusion in a snap-fit arrangement.

Preferably, the cap includes a tab adapted to retain the retaining rim frictionally engaged with the receiving groove and the retaining protrusion.

Preferably, the pressure regulator further comprises a movable arm extending from the regulator body, wherein the retaining rim frictionally engages the movable arm.

Preferably, the pressure regulator further comprises a ball formed at the second end of the valve member and a socket formed in the diaphragm, wherein the ball is configured to engage the socket to couple the valve member to the diaphragm.

Preferably, the valve member comprises an integral component of the diaphragm.

Preferably, the pressure regulator further comprises a biasing member coupled to the second side of the diaphragm and the cap.

Preferably, the pressure regulator further comprises a pressure relief valve located in a bleed port formed in the regulator body.

Preferably, the pressure relief valve is in fluid communication with first side of the diaphragm.

According to another aspect of the invention, a pressure regulator comprises:

a regulator body including a fluid inlet with a valve seat and a fluid outlet;

a cap coupled to the regulator body;

a diaphragm coupled to the regulator body and comprising a first side exposed to the fluid inlet and the fluid outlet and a second side exposed to the cap;

a socket formed in the diaphragm; and a valve member including a valve stem with a ball that is adapted to engage the socket formed in the diaphragm in order to couple the valve member to the diaphragm.

Preferably, the pressure regulator further comprises a receiving groove formed in the regulator body and a retaining protrusion extending from the regulator body, wherein the retaining rim frictionally engages the receiving groove and the retaining protrusion in a snap-fit arrangement.

Preferably, the cap includes a tab adapted to retain the retaining rim frictionally engaged with the receiving groove and the retaining protrusion.

Preferably, the pressure regulator further comprises a movable arm extending from the regulator body, wherein the retaining rim frictionally engages the movable arm.

Preferably, the diaphragm includes a retaining rim adapted to frictionally engage a portion of the regulator body and a tortuous portion configured to bias the retaining rim against the regulator body.

Preferably, the valve member extends from the diaphragm through the fluid inlet and includes a valve seal configured to engage the valve seat.

Preferably, the pressure regulator further comprises a biasing member coupled to the second side of the diaphragm.

Preferably, the pressure regulator further comprises a pressure relief valve located in a bleed port formed in the regulator body.

Preferably, the pressure relief valve is in fluid communication with the first fluid chamber.

DETAILED DESCRIPTION OF THE INVENTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
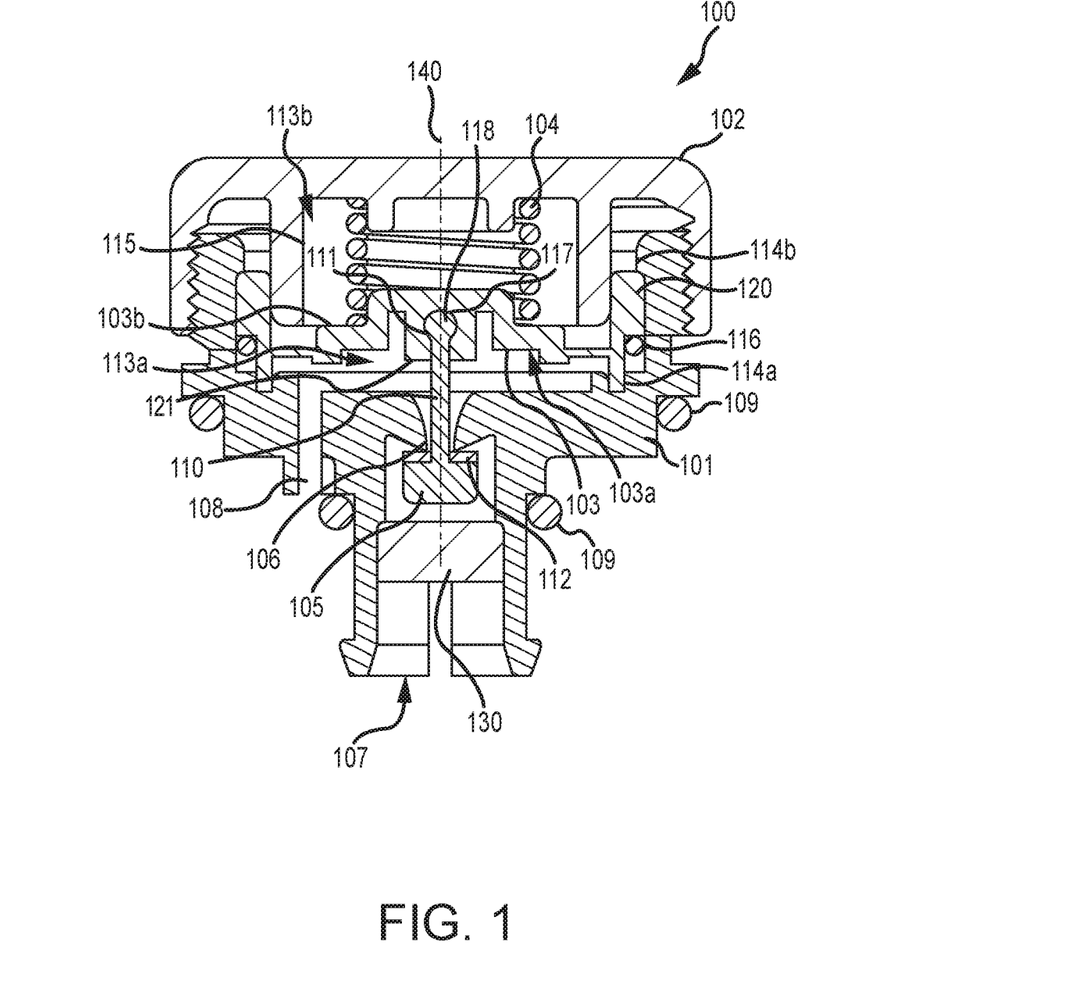
FIG. 1 shows a cross-sectional view of a pressure regulator according to an embodiment of the invention.

FIG. 1 shows a cross-sectional view of a pressure regulator 100 according to an embodiment of the invention. The pressure regulator 100 in the embodiment shown in FIG. 1 includes a regulator body 101, a cap 102 coupled to the regulator body 101, a diaphragm 103, a biasing member 104, a valve member 105, a valve seat 106, a fluid inlet 107, and a fluid outlet 108. As shown, the pressure regulator 100 can also include a plurality of sealing members 109. The sealing members 109 may be provided to form a fluid tight seal between the regulator body 101 and an external regulator receiver (not shown) that provides fluid to the pressure regulator 100.

According to an embodiment of the invention, the diaphragm 103 comprises a first side 103a and a second side 103b. According to an embodiment of the invention, the first side 103a is exposed to a first fluid chamber 113a formed in the pressure regulator 100. The first fluid chamber 113a is defined in part by the regulator body 101 and the diaphragm 103. According to an embodiment of the invention, the fluid inlet 107 and the fluid outlet 108 can communicate with the first fluid chamber 113a. According to an embodiment of the invention, the second side 103b of the diaphragm 103 is exposed to a second fluid chamber 113b. According to an embodiment of the invention, the second fluid chamber 113b is defined in part by the cap 102 and the diaphragm 103.

According to an embodiment of the invention, the diaphragm 103, the biasing member 104, and the valve member 105 are configured to selectively open a fluid flow path between the fluid inlet 107 and the fluid outlet 108. While the valve member 105 is shown as comprising a poppet member, it should be appreciated that other types of valves may be used and therefore, the particular valve illustrated should in no way limit the scope of the present invention. Likewise, while the biasing member 104 is shown as comprising a spring, it should be understood that the biasing member 104 may take other forms as those skilled in the art will readily recognize. In addition, while the biasing member 104 is shown as comprising a separate component, according to some embodiments, the biasing member 104 may comprise an integral component to either the diaphragm 103 or the cap 102, for example. This may be possible by molding the two components from the same material or using a twin shot molding system, for example. In other embodiments, the biasing member 104 may contact the cap 102 and the diaphragm 103, but may not be coupled, but rather free to move independent of the two components. In yet another embodiment, the biasing member 104 may comprise a separate component and coupled to the diaphragm 103 and the cap 102.

According to an embodiment of the invention, the biasing member 104 can be adapted to provide a biasing force on the diaphragm 103. According to an embodiment of the invention, the biasing member 104 engages the diaphragm 103 on the second side 103b of the diaphragm 103. Therefore, the biasing member 104 can be positioned in the second fluid chamber 113b of the pressure regulator 100. According to an embodiment of the invention, the biasing force provided by the biasing member 104 is in a first direction, which is down as shown in the figure. As a result, the biasing member 104 can at least partially deform the diaphragm 103 by pushing it down towards the inlet 107.

According to an embodiment of the invention, the valve member 105 includes a valve stem 110. The valve member 105, and more specifically, the valve stem 110 of the valve member 105 can be received within a valve stem receiver 111 formed in the diaphragm 103. As can be seen, the valve stem 110 extends through the fluid inlet 107 with a valve seal 112 provided on the valve member 105 positioned proximate the valve seat 106 outside of the first fluid chamber 113a. Therefore, as the diaphragm 103 deforms towards the inlet 107, the valve member 105 is biased down and away from the valve seat 106. As a result, the seal between the valve seal 112 and the valve seat 106 breaks, thereby opening a fluid flow path between the inlet 107 and the outlet 108.

As fluid passes between the valve seal 112 provided on the valve member 105 and the valve seat 106, the fluid enters the first fluid chamber 113a. According to an embodiment of the invention, when a fluid flow path opens between the valve seal 112 and the valve seat 106, fluid can communicate between the fluid inlet 107, the fluid outlet 108, and the first fluid chamber 113a. If fluid flows into the first fluid chamber 113a from the fluid inlet 107 faster than the fluid exits through the fluid outlet 108, the pressure within the first fluid chamber 113a will increase. Once the pressure in the first fluid chamber 113a reaches a predetermined pressure, which is determined in part by the biasing force provided by the biasing member 104 and the relative flexibility of the diaphragm 103, the diaphragm 103 will be biased in a second direction, which is substantially opposite the first direction. In other words, once the force provided by the pressure in the first fluid chamber 113a acting on the diaphragm 103 exceeds the force of the biasing member 104, the diaphragm 103 will be biased upwards. As the diaphragm 103 moves upwards away from the fluid inlet 107, the valve member 105 and the valve seal 112 move upwards as well and are brought back towards the valve seat 106. As the opening between the valve seat 106 and the valve seal 112 decreases, the fluid flowing into the first fluid chamber 113a also decreases. If fluid is flowing out of the fluid outlet 108 faster than it is flowing into the first fluid chamber 113a through the fluid inlet 107, the pressure in the first fluid chamber 113a will decrease. As can be appreciated, the position of the diaphragm 103 is determined based on a force balance between the force provided by pressure in the first fluid chamber 113a and the force provided by the biasing member 104. Therefore, the pressure in the first fluid chamber 113a and thus, the pressure delivered to the fluid outlet 108 can be adjusted by adjusting the force of the biasing member 104. One method of adjusting the force of the biasing member 104 is to adjust the compression of the biasing member 104. While prior art pressure regulators require an additional component to adjust the compression of the biasing member, the present invention uses the cap to adjust the compression of the biasing member 104.

According to an embodiment of the invention, the force of the biasing member 104 can be adjusted by adjusting the position of the cap 102 relative to the regulator body 101. Therefore, in some embodiments, the cap 102 may comprise an adjustable cap. While the cap 102 is shown as threadedly engaging the regulator body 101, the present invention should not be limited to requiring threads. As those skilled in the art will readily appreciate, the cap 102 may engage the regulator body 101 in a variety of alternative ways and the particular engagement chosen should in no way limit the scope of the present invention. However, the discussion below is limited to a cap 102 that threadedly couples to the regulator body 101 for the purposes of simplicity and consistency. As can be appreciated, the further down the cap 102 is positioned relative to the regulator body 101, the more the biasing member 104 is compressed. As the compression of the biasing member 104 increases, the pressure in the first fluid chamber 113a required to counter the force of the biasing member 104 increases.

According to an embodiment of the invention, the valve member 105 is coupled to the diaphragm 103 such that internal leakage is substantially reduced. One problem typically encountered in pressure regulators is internal leakage, also known as regulator creep, as discussed above. This occurs when the sealing member 112 of the valve member 105 does not completely seal against the valve seat 106. The incomplete seal may be due to contaminates or due to movement of the regulator components. Another source of regulator creep is due to inadequate sealing or the failure of the seal between the diaphragm and the regulator housing. As discussed above, regulator creep can cause serious problems, especially when the regulator 100 is implemented in infusion devices because the patient may receive an increased dosage. In some embodiments, regulator creep can cause the outlet pressure to increase beyond the desired outlet pressure. Regulator creep is reduced in a number of ways by the present invention.

According to an embodiment of the invention, the pressure regulator 100 includes a filter 130 positioned in the fluid inlet 107. According to an embodiment of the invention, the filter 130 can be positioned upstream from the valve member 105. The filter 130 can reduce the presence of contaminates that affect the sealing characteristics of the pressure regulator 100. The filter 130 may be held within the fluid inlet 107 in a number of ways including adhesives, friction fit, bonding, etc. Therefore, the particular method used for holding the filter 130 in place should not limit the scope of the present invention. Furthermore, the particular type of filter implemented may depend upon a variety of factors including the expected fluid pressure, the particular fluid flowing through the pressure regulator, the amount of time the filter is required to function, etc.

According to an embodiment of the invention, the valve stem 110 can be coupled to the stem receiver 111 using a ball and socket arrangement. In other words, a socket 118 can be formed in the stem receiver 111. The socket 118 may comprise an opening or cavity, for example. According to an embodiment of the invention, a ball 117 can be formed at the end of the valve stem 110. The ball 117 can be adapted to engage the socket 118. The ball 117 and socket 118 may engage one another as is generally known with ball and socket arrangements. For example, as the ball 117 is inserted into the socket 118, the socket 118 may partially resiliently deform. Once the ball 117 is fully engaged, the socket 118 may return to its original position. This frictional engagement may require a predetermined force to engage the two components. Furthermore, a predetermined force may be required to disengage the two components. The predetermined force required to disengage the ball 117 and socket 118 may be greater than the typical forces the pressure regulator 100 will experience.

The ball and socket arrangement provides a number of advantages over prior art methods of coupling the valve member 105 to the diaphragm 103. One advantage is that once the ball 117 is received in the socket 118, the ball 117 is free to rotate or otherwise move within the socket 118. However, movement of the valve stem 110 relative to the diaphragm 103 in a direction parallel to the longitudinal axis 140 is substantially prevented. As a result, the ball 117 and socket 118 allows the valve seal 112 to self-align relative to the valve seat 106. This self-alignment reduces the chance of regulator creep due to insufficient manufacturing tolerances or changes in the position of the valve member 105 due to vibrations, for example.

Another cause of regulator creep is due to changes in the position of the various components of the pressure regulator 100. This shifting may be due to vibrations, for example. Prior art methods simply push the valve stem against the diaphragm with a spring or similar member. While this configuration may provide adequate results during most operations, the configuration does not allow the diaphragm 103 to positively pull up on the valve stem 110.

The prior art methods for coupling the valve stem to the diaphragm were susceptible to shifting, which could potentially result in a change in the sealing characteristics of the regulator. In many of the prior art regulators, the coupling between the valve stem and the diaphragm resulted in a constant tension in the coupling as the pressure against the diaphragm pulled away from the valve member. However, the present invention couples the valve stem 110 to the diaphragm 103 in such a way that an increase in the pressure in the first fluid chamber 113a increases the coupling force between the valve stem 110 and the diaphragm 103 rather than weakening the coupling force.

As can be seen, the stem receiver 111 comprises an approximately U-shaped cavity comprising the socket 118 that receives the ball 117 of the valve stem 110. According to an embodiment of the invention, the biasing member 104 contacts the diaphragm 103 on the second side 103b of the diaphragm 103. According to another embodiment of the invention, the biasing member 104 is coupled to the diaphragm 103 on the second side 103b of the diaphragm 103. According to an embodiment of the invention, the biasing member 104 is coaxially aligned with and located radially outside of the stem receiver 111. As pressure increases in the first fluid chamber 113a to above the predetermined pressure, the diaphragm 103 is biased upwards and with the biasing member 104 positioned radially outside of the stem receiver 111, movement in the second direction, i.e., upward movement, of the diaphragm 103 results in the stem receiver 111 compressing around the ball 117 of the valve stem 110. Therefore, as the force acting on the first side 103a of the diaphragm 103 due to pressure in the first fluid chamber 113a increases to above the force acting on the second side 103b of the diaphragm 103 due to the biasing member 104, the diaphragm 103 will be biased upwards. As the diaphragm 103 moves upwards the coupling force between the valve member 105 and the diaphragm 103 increases, thereby creating a "positive lock." If the valve stem 110 shifts due to vibration of the regulator 100 and the valve member 105 becomes misaligned relative to the valve seat 106, fluid may leak into the first fluid chamber 113a thereby increasing the pressure. The increase in pressure will act to pull up on the valve member 105 and increase the sealing force between the valve seal 112 and the valve seat 106. In addition, the coupling force between the valve stem 110 and the stem receiver 111 also increases. It will be clear that a protrusion 121 formed by the diaphragm 103 aids in providing the increased coupling force against the valve stem 110 and the ball 117. The coupling substantially reduces the chance of regulator creep due to undesirable movements of the regulator components. Prior art regulators cannot actively pull up on the valve stem to increase the sealing force as in the present invention. Therefore, if a small leak occurs in a prior art regulator, the pressure will continue to rise above the desired outlet pressure.

According to an embodiment of the invention, the valve seal 112 comprises a flat sealing member. The flat sealing member can reduce the chance of leaks due to variations in the concentricity between the diaphragm 103 and the valve member 105. Furthermore, in some embodiments, the valve stem 110 may be molded, which typically results in a split-line where the mold is separated from the molded component. The split-line is a common point of leaking when the valve seal comprises an O-ring, for example. Therefore, the use of a flat sealing member can avoid this particular cause of leaking.

Another way the present invention reduces the risk of internal leaking is due to the configuration used to secure the diaphragm 103 in place within the regulator body 101. While the pressure regulator 100 may include a separate retaining member or retaining clip to retain and seal the diaphragm 103, in many embodiments, this additional component can be omitted. According to an embodiment of the invention, the diaphragm 103 is secured in place by frictionally engaging the regulator body 101. While prior art regulators secure the diaphragm 103 using a separate retaining ring or retaining member, the frictional engagement of the present invention does not require a separate component to secure the diaphragm 103 in place. Rather, according to an embodiment of the invention, the frictional engagement requires a predetermined force to fully engage the two components. Likewise, a predetermined force may be required to disengage the two components. Advantageously, the frictional engagement may be such that the normal operating conditions of the pressure regulator 100 do not provide sufficient force to disengage the diaphragm 103 from the regulator housing 101. Therefore, the friction fit can hold the diaphragm 103 within the regulator housing 101 with a substantially fluid tight seal. The frictional engagement may comprise a variety of arrangements including, a snap-fit, a compression fit, threaded fit, etc. The discussion that follows provides examples of various frictional engagement configurations; however, the examples that are provided are not exhaustive.

According to an embodiment of the invention, a receiving groove 114a is formed in the regulator body 101. According to an embodiment of the invention, the regulator body 101 also includes a retaining protrusion 114b. According to an embodiment of the invention, the diaphragm 103 includes a retaining rim 120. The retaining rim 120 can be sized and adapted to frictionally engage the receiving groove 114a on a first side and frictionally engage the retaining protrusion 114b on a second side. In other words, the retaining rim 120 of the diaphragm 103 can engage the receiving groove 114a and then engage the retaining protrusion 114a. As the retaining rim 120 engages the retaining protrusion 114a, the retaining rim 120, the retaining protrusion 114a or both may partially deform and then return to the original position once the diaphragm 103 is fully frictionally engaged in a frictional "snap-fit" arrangement. Therefore, the diaphragm 103 can be frictionally held by the receiving groove 114a and the retaining protrusion 114b.

While not required, in some embodiments, such as the embodiment shown in FIG. 1, the cap 102 includes a tab 115. The tab 115 can be provided to ensure that the retaining rim 120 remains in place in the receiving groove 114a and the retaining protrusion 114b. As can be appreciated, the present invention does not require a separate component to create a fluid tight seal between the diaphragm 103 and the regulator body 101. Rather, the diaphragm 103 forms a substantially fluid tight seal with the regulator body 101 using a snap-fit arrangement between the diaphragm 103 and the regulator body 101. Advantageously, less components are required that could fail resulting in a leak. Furthermore, the seal between the diaphragm 103 and the regulator body 101 is not dependent upon the tightness of the cap 102 relative to the regulator body 101.

According to an embodiment of the invention, the diaphragm 103 can also include one or more sealing members 116. The sealing member 116 can be provided to ensure the diaphragm 103 forms a fluid tight seal with the regulator body 101. According to some embodiments, the sealing member 116 may comprise a separate component, such as an O-ring or a K-ring, for example. According to another embodiment of the invention, the sealing member 116 may comprise an integral component of the diaphragm 103. For example, the diaphragm 103 may comprise a molded component with the sealing member 116 being molded to the diaphragm 103. In some embodiments, the diaphragm 103 and the sealing member 116 may be formed using a twin shot molding process, wherein the diaphragm 103 and the sealing member 116 are molded from separate substances but at substantially the same time in a single mold. Other molding techniques are possible and known in the art that could form the diaphragm 103 and the sealing member 116 as integral components. Therefore, the particular method used for forming the diaphragm with an integrated seal should not limit the scope of the present invention.

Figure 2:
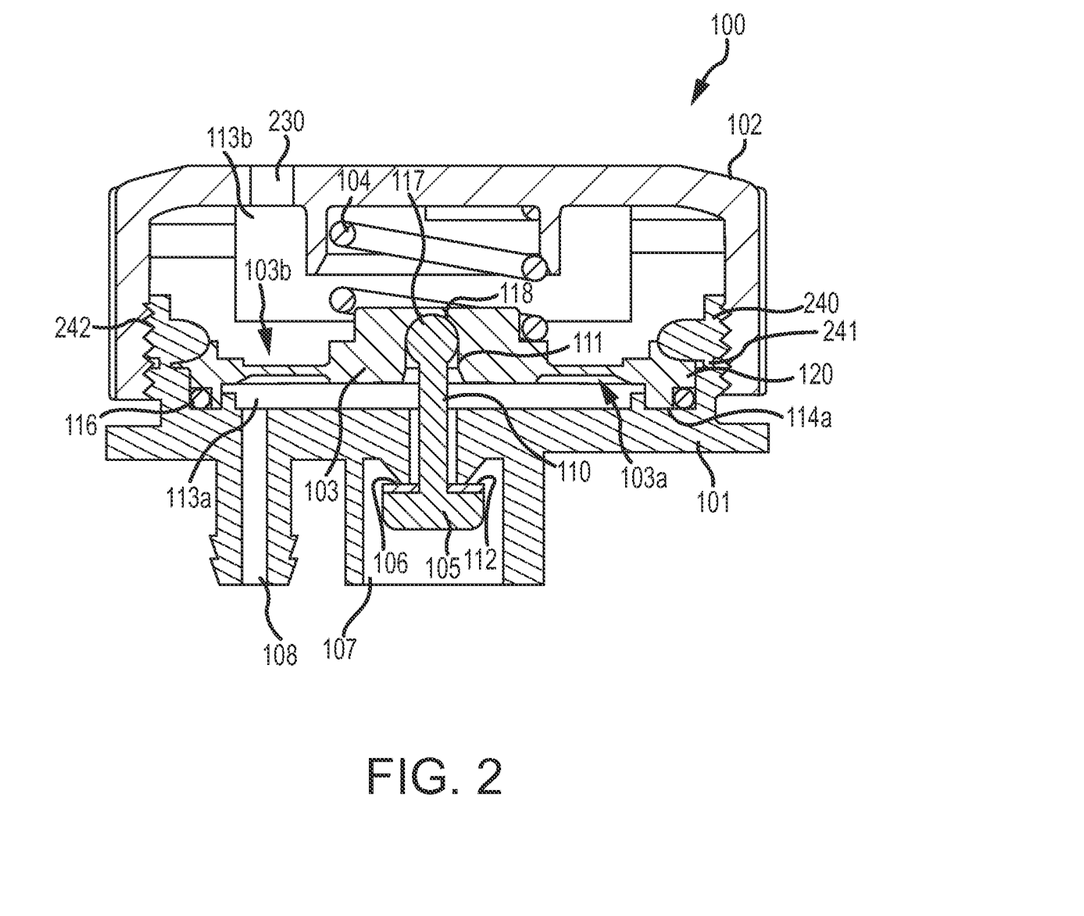
FIG. 2 shows a cross-sectional view of the pressure regulator according to another embodiment of the invention.

FIG. 2 shows a cross-sectional view of the pressure regulator 100 according to another embodiment of the invention. The embodiment shown in FIG. 2 is similar to the embodiment shown in FIG. 1, except for the components used to secure the diaphragm 103 to the regulator body 101. In the embodiment shown in FIG. 2, the regulator body 101 includes a movable arm 240 attached by a hinge portion 241. According to an embodiment of the invention, the hinge portion 241 comprises a section of reduced thickness, for example. Prior to the cap 102 being coupled to the regulator body 101, the movable arm 240 can be flexed or otherwise moved out of position via the hinge portion 241 in order to position the retaining rim 120 within the receiving groove 114a. The movable arm 240 can then be repositioned adjacent the retaining rim 120 in order to secure the diaphragm 103 in place. Therefore, the retaining rim 120 can be coupled to the regulator body 101 by a snap fit arrangement between the retaining rim 120, the receiving groove 114a, and the movable arm 240. According to an embodiment of the invention, the cap 102 can engage the movable arm 240 to secure the movable arm 240 against the retaining rim 120.

According to some embodiments, the movable arm 240 may include threads 242 formed on the outer surface of the movable arm 240. In this embodiment, the cap 102 can engage the threads 242 as the cap 102 is secured to the regulator body 101.

As can be appreciated, with the cap 102 in place, the movable arm 240 is held against the retaining rim 120. Therefore, while the diaphragm 103 is retained by the regulator body 101, and more particularly, the adjustable arm 240, the cap 102 can ensure that vibrations do not cause the diaphragm 103 to disengage from the receiving groove 114b. As can be appreciated, unlike prior art systems that trap the diaphragm between the body and the cap, thereby requiring the cap to remain stationary with respect to the body, the present invention allows the position of the cap 102 to vary. Therefore, the cap 102 may be repositioned relative to the regulator body 101 in order to adjust the compression of the biasing member 104 without varying the sealing effect of the diaphragm 103.

Additionally shown in FIG. 2 is a vent port 230 formed in the cap 102. The vent port 230 can be provided in some embodiments to allow the diaphragm 103 to move more easily. Without the vent port 230, the pressure in the second fluid chamber 113b would increase as the diaphragm 103 is actuated upwards. The vent port 230 prevents the pressure from increasing and therefore, allows for better pressure control in the first fluid chamber 113a. Conversely, without the vent port 230, a greater force would be required by the biasing member 104 due to the vacuum that would resist downward movement of the diaphragm 103.

Figure 3:
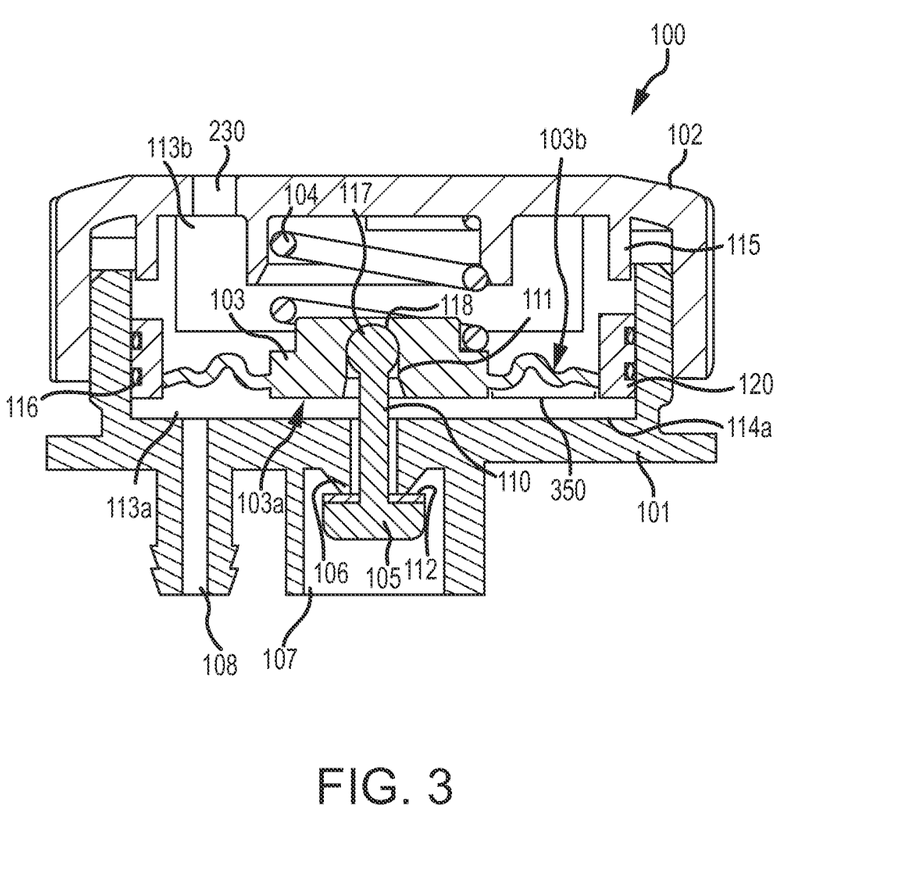
FIG. 3 shows a cross-sectional view of the pressure regulator according to another embodiment of the invention.

FIG. 3 shows a cross-sectional view of the pressure regulator 100 according to another embodiment of the invention. In the embodiment shown in FIG. 3, the diaphragm 103 includes a tortuous section 350. The tortuous section 350 acts like a spring to continuously bias the retaining rim 120 away from the center of the diaphragm 103 and against the regulator body 101. The tortuous section 350 of the diaphragm 103 allows the retaining rim 120 to be compressed inwards towards the center of the diaphragm 103 to be positioned in the regulator body 101. The retaining rim 120 then frictionally engages the regulator body 101 with the tortuous section 350 providing a constant outward biasing force. The outward biasing force acts to seal the diaphragm 103 against the regulator body 101. As discussed above, the diaphragm's sealing members 116 may comprise separate components or integral components of the diaphragm 103.

According to an embodiment of the invention, the cap 102 may engage the regulator body 101 and be positioned based on the desired compression in the biasing member 104. In some embodiments, once the desired compression is reached, the cap 102 may be substantially permanently secured to the regulator body 101. The substantially permanent securing may be accomplished using welding, brazing, adhesives, ultrasonic welding, etc. The particular method used for securing the cap 102 to the regulator body 101 is not important for purposes of the present invention and therefore, should in no way limit the scope of the present invention.

In some embodiments, the retaining rim 120 may slide within the regulator body 101 in response to the pressure in the first fluid chamber 113a along with the force of the biasing member 104. According to an embodiment of the invention, rather than ensuring the diaphragm 103 does not disengage the receiving groove 114a and the retaining protrusion 114b, the tab 115 may be provided to limit the upward travel of the diaphragm 103. Therefore, the diaphragm 103 is kept in a position where the retaining rim 120 frictionally engages the regulator body 101 to ensure a fluid tight seal.

Figure 4:
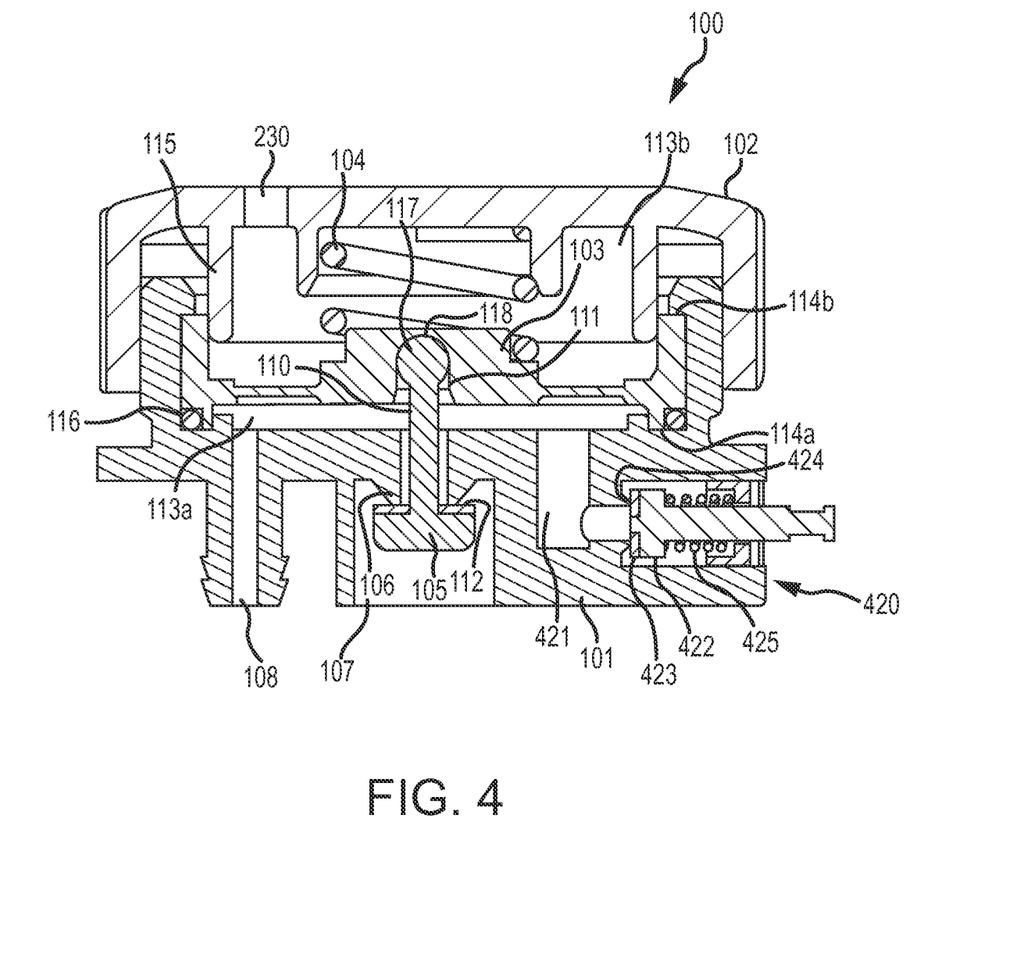
FIG. 4 shows a cross-sectional view of the pressure regulator according to another embodiment of the invention.

FIG. 4 shows a cross-sectional view of the pressure regulator 100 according to another embodiment of the invention. The pressure regulator 100 shown in FIG. 4 is similar to the pressure regulator 100 shown in FIG. 1, except the embodiment shown in FIG. 4 also includes a pressure relief valve 420. According to an embodiment of the invention, the pressure relief valve 420 is positioned within a bleed port 421 formed in the regulator body 101. The bleed port 421 is in fluid communication with the first fluid chamber 113a. Therefore, according to an embodiment of the invention, the pressure within the bleed port 421 is substantially equal to the pressure in the first fluid chamber 113a. The pressure relief valve 420 may be secured in the bleed port 421 in a number of ways including, but not limited to adhesives, welding, bonding, brazing, friction fit, etc. Therefore, the particular method used to couple the pressure relief valve 420 to the bleed port 421 should not limit the scope of the present invention.

According to an embodiment of the invention, the pressure relief valve 420 comprises a movable valve member 422, such as a poppet member, a valve seal 423, a valve seat 424 formed in the regulator body 101, and a biasing member 425. The biasing member 425 can bias the valve member 422 towards the valve seat 424. With the valve member 422 biased towards the valve seat 424, a substantially fluid tight seal can be formed between the valve seal 423 and the valve seat 424. The force of the biasing member 425 can be adjusted such that the valve member 422 actuates away from the valve seat 424 at a predetermined pressure. The predetermined pressure may be set at a threshold pressure. According to an embodiment of the invention, the threshold pressure is greater than the desired outlet pressure as determined by the biasing member 104. For example and not limitation, in some embodiments, the inlet pressure may be approximately 2.5 bar (36.3 psi) with the outlet or regulated pressure being approximately 0.5 bar (7.3 psi). Based on these pressures, the relief valve 420 may be set to open at a threshold pressure of approximately 0.75 bar (10.88 psi).

As a result, if the pressure in the first fluid chamber 113a exceeds the set pressure, the pressure relief valve 420 can actuate to relieve the increased pressure. Therefore, in situations where the pressure regulator 100 is implemented in an infusion system, the pressure relief valve 420 ensures that the pressure output by the fluid outlet 108 does not exceed a predetermined pressure. When the pressure regulator 100 is implemented in an infusion device, the pressure relief valve 420 can therefore ensure the patient does not receive a dosage that exceeds the desired dosage of medicine or other fluid being delivered. As an alternative, the pressure relief valve 420 may be manually operated to exhaust the pressure in the first fluid chamber 113a. This may be necessary or desired to stop fluid from flowing through the pressure regulator 100, for example to relieve the pressure acting on an infusion bag. Therefore, the pressure relief valve 420 can provide a manual override to the pressure regulator 100.

Figure 5:
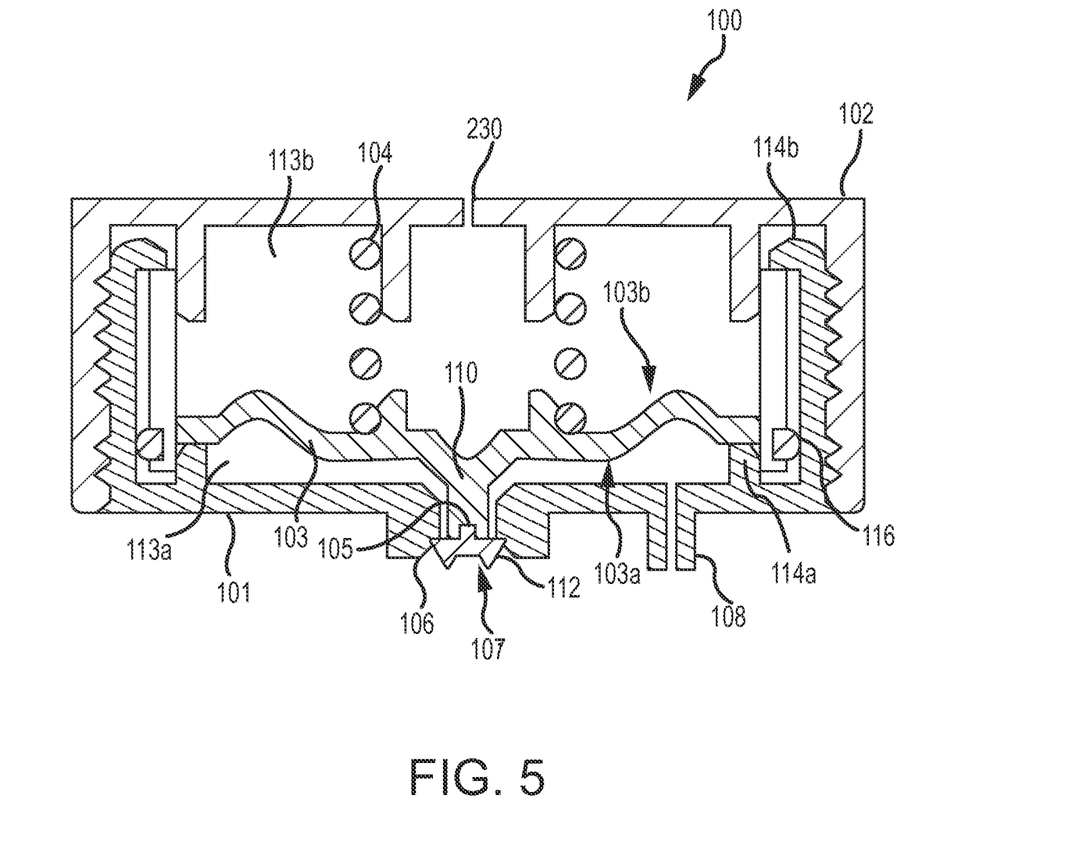
FIG. 5 shows a cross-sectional view of the pressure regulator according to another embodiment of the invention.

FIG. 5 shows a cross-sectional view of the valve 100 according to another embodiment of the invention. In the embodiment shown in FIG. 5, the valve member 105 comprises an integral portion of the diaphragm 103. According to an embodiment of the invention, the diaphragm 103 and the valve stem 110 can be molded as a single component, for example. As a result, the chance of internal leakage due to movement of components from vibration is substantially reduced. The valve stem 110 may be formed such that it has a high tensile strength relative to the bending strength. As a result, the valve stem 110 can adequately pull up on the valve member 105 in the longitudinal direction, and can bend in a direction perpendicular to the longitudinal axis 140 in order to form a better seal between the valve seal 112 and the valve seat 106. This may be especially useful if there is a small leak due to manufacturing tolerances. It should be appreciated however, that because the valve seal 112 is positioned outside of the first fluid chamber 113a, an increase in the pressure in the first fluid chamber 113a will increase the sealing force between the valve seal 112 and the valve seat 106.

It should be appreciated that the valve seals 112 shown in the figures are merely examples of various suitable designs. For example, the valve seals 112 may comprise O-rings, flat gaskets, Quad-seals, twin-shot molded seals, etc. Therefore, the particular examples shown should in no way limit the scope of the present invention.

The present invention provides a pressure regulator 100 with increased sealing capabilities. The various components of the pressure regulator 100 are coupled together in a manner that reduces the chance of internal leakage. Furthermore, the number of required components of the pressure regulator is substantially reduced compared to prior art systems. As a result, the pressure regulator 100 of the present invention can be manufactured at a reduced cost allowing the pressure regulator 100 to be implemented in a disposable system.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other pressure regulators, and not just to the embodiments described above and shown in the accompanying figures. Accordingly, the scope of the invention should be determined from the following claims.

We claim:

1. A pressure regulator (100), comprising:
　a regulator body (101) including a fluid inlet (107) and a fluid outlet (108);
　a cap (102) coupled to the regulator body (101);
　a diaphragm (103) positioned within the regulator body (101) and including:
　　a first side (103a) exposed to the fluid inlet (107) and the fluid outlet (108);
　　a second side (103b) exposed to the cap (102); and
　　a retaining rim (120) configured to frictionally engage the regulator body (101) to form a substantially fluid tight seal between the diaphragm (103) and the regulator body (101);

a biasing member (104) coupled to the second side (103b) of the diaphragm and the cap (102);

a valve member (105) including a valve stem (110) extending through the fluid inlet (107) and coupled to the diaphragm (103);

a ball (117) formed at the second end of the valve member (105) and a socket (118) formed in the diaphragm (103), wherein the ball (117) is configured to engage the socket (118) to couple the valve member (105) to the diaphragm (103);

a stem receiver defined by the diaphragm proximate the socket; and a channel defined by the diaphragm disposed proximate the socket and stem receiver, wherein the channel is substantially orthogonal to the first side of the diaphragm and located between the socket and the biasing member, wherein the channel defines an outer surface of a protrusion defined by the diaphragm, wherein the protrusion is configured to allow a proximate fluid pressure to compress the protrusion around the ball and the valve stem.

2. The pressure regulator (100) of claim 1, further comprising a receiving groove (114a) formed in the regulator body (101) and a retaining protrusion (114b) extending from the regulator body (101), wherein the retaining rim (120) frictionally engages the receiving groove (114a) and the retaining protrusion (114b) in a snap-fit arrangement.

3. The pressure regulator (100) of claim 2, wherein the cap (102) includes a tab (115) adapted to retain the retaining rim (120) frictionally engaged with the receiving groove (114a) and the retaining protrusion (114b).

4. The pressure regulator (100) of claim 1, further comprising a movable arm (241) extending from the regulator body (101), wherein the retaining rim (120) frictionally engages the movable arm (241).

5. A pressure regulator (100), comprising:

a regulator body (101) including a fluid inlet (107) with a valve seat (106) and a fluid outlet (108);

a cap (102) coupled to the regulator body (101);

a diaphragm (103) coupled to the regulator body (101) and comprising a first side (103a) exposed to the fluid inlet (107) and the fluid outlet (108) and a second side (103b) exposed to the cap (102);

a socket (118) formed in the diaphragm (103); and a valve member (105) including a valve stem (110) with a ball (118) that is adapted to engage the socket (118) formed in the diaphragm (103) in order to couple the valve member (105) to the diaphragm (103)

a channel defined by the diaphragm that at least partially circumscribes the socket, wherein the channel is substantially orthogonal to the first side of the diaphragm and located proximate the socket, wherein the channel defines an outer surface of a protrusion defined by the diaphragm, wherein the protrusion is configured to allow a proximate fluid pressure to compress the protrusion around the ball and the valve stem.

6. The pressure regulator (100) of claim 5, further comprising a receiving groove (114a) formed in the regulator body (101) and a retaining protrusion (114b) extending from the regulator body (101), wherein the retaining rim (120) frictionally engages the receiving groove (114a) and the retaining protrusion (114b) in a snap-fit arrangement.

7. The pressure regulator (100) of claim 6, wherein the cap (102) includes a tab (115) adapted to retain the retaining rim (120) frictionally engaged with the receiving groove (114a) and the retaining protrusion (114b).

8. The pressure regulator of claim 5, further comprising a movable arm (241) extending from the regulator body (101), wherein the retaining rim (120) frictionally engages the movable arm (241).

9. The pressure regulator (100) of claim 5, wherein the diaphragm (103) includes a retaining rim (120) adapted to frictionally engage a portion of the regulator body (101) configured to bias the retaining rim (120) against the regulator body (101).

10. The pressure regulator (100) of claim 5, wherein the valve member (105) extends from the diaphragm (103) through the fluid inlet (107) and includes a valve seal (112) configured to engage the valve seat (106).

11. The pressure regulator (100) of claim 5, further comprising a biasing member (104) coupled to the second side (103b) of the diaphragm (103).

* * * * *